United States Patent [19]

Clendening Jr. et al.

[11] Patent Number: 4,936,660
[45] Date of Patent: Jun. 26, 1990

[54] OPTICAL PHASE CONJUGATION USING STIMULATED BRILLOUIN SCATTERING WITH MULTIPLE FOCI

[75] Inventors: Charles W. Clendening Jr., Torrance; Jesper Munch, Playa Del Rey, both of Calif.

[73] Assignee: TRW Inc., Redondo Beach, Calif.

[21] Appl. No.: 179,606

[22] Filed: Apr. 11, 1988

[51] Int. Cl.⁵ .................................. G02F 1/35
[52] U.S. Cl. ................................. 350/354
[58] Field of Search ............... 350/354; 372/21, 97, 372/99, 22

[56] References Cited

U.S. PATENT DOCUMENTS 4,344,042  8/1982  Hon ........................... 372/21 X
4,791,644  12/1988  Dubé .......................... 372/97 X

Primary Examiner—Eugene R. LaRoche
Assistant Examiner—Nathan W. McCutcheon
Attorney, Agent, or Firm—Noel F. Heal

[57] ABSTRACT

A device and corresponding method for optical phase conjugation using a stimulated Brillouin scattering (SBS) medium and resulting in a reduction in the (SBS) threshold level. An incident light beam is brought to a first focus in the SBS medium, and light transmitted through the first focus is brought to a second focus in the SBS medium. Light transmitted through the second focus is brought to a third focus, and so forth through N foci in the medium. The effective SBS threshold level is inversely proportional to the number of foci N, which may be located in separate SBS cells, or may be in a single cell through which multiple passes are made by means of appropriate reflective optics. Laser sources operating in multiple longitudinal modes are handled by spacing the foci at an intergral multiple of the laser resonant cavity length.

16 Claims, 1 Drawing Sheet

OPTICAL PHASE CONJUGATION USING STIMULATED BRILLOUIN SCATTERING WITH MULTIPLE FOCI

This invention was made with Government support under Contract No. N00014-86-C-2345 awarded by The Department of Navy, Naval Research Laboratory. The Government has certain rights in this invention.

BACKGROUND OF THE INVENTION

This invention relates generally to optical phase conjugation and, more particularly, to optical phase conjugation using stimulated Brillouin scattering (SBS). It has been recognized for some time that phase conjugation of light waves has some important applications, such as the removal of phase aberrations caused by the passage of a light beam through a distorting or phase-aberrating medium.

There is extensive literature on the subject of phase conjugate optics and the use of phase conjunction for the compensation of phase aberrations. A summary of the history and principles of phase conjugate optics is provided in a paper entitled "Phase Conjugate Optics and Real-Time Holography," by Amnon Yariv, IEEE Journal of Quantum Electronics, Vol. QE-14, No. 9, Sept., 1978, pp. 650-60.

Simply stated, a phase conjugation cell functions as a reflector with a special and useful property. When an incident light wave is focused into the cell, the reflected wave that emerges is the complex conjugate of the incident wave. The practical consequence of the phase conjugation is that the retro-reflected wave is as if it were "time-reversed" with respect to the incident wave. For example, if an incident wave, after passing through a distorting medium, has a bulge in its wavefront, representing a phase-lagging condition at a particular region of the front, this will be reflected as an opposite bulge, i.e. a phase-leading condition, in the same region of the reflected wavefront. If the reflected wavefront then traverses the same distorting medium that caused the original bulge in the incident wavefront, the reflected wave will emerge from the distorting medium as an undistorted wave.

Phase conjugation can be achieved through the use of stimulated Brillouin scattering. When a light beam of sufficient energy is focused into a stimulated Brillouin scattering (SBS) cell, there is reflection of a phase-conjugated beam. Unfortunately, however, the SBS phase conjugation process has a relatively high threshold of operation. That is to say, relatively high powers are required before the phase conjugation process even begins to work. In many high-power laser applications, consideration is being given to operation at power levels many times the threshold, for most efficient operation. If the threshold is too high, operation at multiples of the threshold becomes impractical. Consequently, SBS phase conjugation has been limited for use at relatively low average power levels, using short pulses of operation.

In the past, optical waveguides have been used to increase the effective interaction length in SBS phase conjugation. However, this approach is limited to relatively low powers and cannot be scaled up for use with high-power lasers.

The availability of a lower threshold SBS cell would facilitate the use of SBS phase conjugation for higher average power situations, and would allow the use of laser sources of lower power. In addition, a lower threshold SBS cell would reduce problems due to competing processes, such as thermal blooming, and would increase the overall efficiency of a system including SBS cells and laser sources.

It will be appreciated from the foregoing that there is a clear need for a new technique for reducing the threshold of operation of an SBS phase conjugation cell. The present invention is directed to this end.

SUMMARY OF THE INVENTION

The present invention resides in the use of multiple foci in an SBS medium, to reduce the SBS threshold in inverse proportion to the number of foci. Briefly, and in general terms, the device of the invention includes at least one stimulated Brillouin scattering (SBS) cell containing an SBS medium, first focusing means for focusing an incident light beam to a first focus in the SBS medium, and second focusing means, for focusing light transmitted through the first focus, to a second focus in the SBS medium, whereby the effective SBS threshold level is inversely proportional, approximately, to the number of foci in the SBS medium.

In one disclosed embodiment of the invention, the first and second foci are located in separate first and second SBS cells, the first focusing means including a lens disposed in the path of the incident beam, and the second focusing means including a lens disposed between the first and second SBS cells. In an alternative embodiment, the first and second foci are located in a single SBS cell, the first focusing means including a lens disposed in the path of the incident beam, and the second focusing means including a curved mirror disposed in the path of the light transmitted through the first focus, to reflect and focus the light back into the SBS cell at the second focus, which is displaced laterally from the first.

To handle laser sources operating in multiple longitudinal modes, the first and second foci are spaced apart by approximately nL, measured in the direction of light propagation between the foci, where n is a positive integer and L is the length of the resonant cavity of the laser source.

Stated with more generality, the device of the invention includes a plurality (N) of SBS cells, including first, second, (N−1)th and Nth SBS cells, and an equal plurality (N) of focusing means, including first, second and Nth focusing means. The first focusing means is disposed in the path of an incident light beam and focuses the beam to a first focus within the first SBS cell. The second focusing means is disposed in the path of light transmitted through the first focus and out of the first SBS cell, and functions to focus this transmitted light to a second focus in the second SBS cell. The Nth focusing means is disposed in the path of light transmitted through an (N−1)th focus and out of the (N−1)th SBS cell, and functions to focus this transmitted light to an Nth focus in the Nth SBS cell. As before, the effective SBS threshold level is inversely proportional, approximately, to the number N of foci in the SBS medium.

In terms of a method, the invention comprises the steps of focusing an incident beam to a first focus within an SBS medium, and focusing light transmitted through the first focus, to a second focus within the SBS medium, whereby the effective SBS threshold level is inversely proportional, approximately, to the number of foci in the SBS medium.

It will be appreciated from the foregoing summary that the present invention represents a significant advance in the field of optical phase conjugation techniques. In particular, the invention provides a simple yet effective technique for the reduction of the SBS threshold level. Other aspects and advantages of the invention will become apparent from the following more detailed description, taken in conjunction with the accompanying drawings.

DESCRIPTION OF THE PREFERRED EMBODIMENTS

Figure 1:
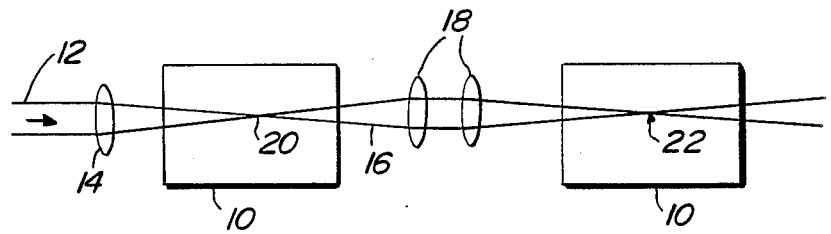
FIG. 1 is a schematic view of a two-cell implementation of the present invention.

As shown in the drawings for purposes of illustration, the present invention is concerned with an improvement in the area of optical phase conjugation using stimulated Brillouin scattering (SBS) cells. In the past, SBS cells have been limited in application because of their relatively high threshold level of operation as phase conjugation devices.

In accordance with the invention, a lower threshold level is achieved in SBS phase conjugation, by arranging for an incident beam to be focused at multiple foci in the SBS medium. The multiple foci can be either in a single SBS cell or in multiple SBS cells.

FIG. 1 shows the basic arrangement of the invention using multiple SBS cells, indicated by reference numeral 10, two of which are shown. An incident beam 12 is focused by a lens 14 into a first of the cells 10. A transmitted portion 16 of the incident beam is refocused by additional lenses 18 into the second of the SBS cells 10. Thus there are two foci, indicated at 20 and 22, respectively.

In theory, the mathematical expression for the threshold level of an SBS cell includes an integral that can be reduced by the use of multiple foci in the SBS medium. The use of two foci reduces the overall threshold by a factor of two, if losses are neglected. In general, an N-foci arrangement reduces the SBS threshold level by a factor N. At present it is considered feasible to reduce the SBS threshold level by as much as an order of magnitude using this technique.

Figure 2:
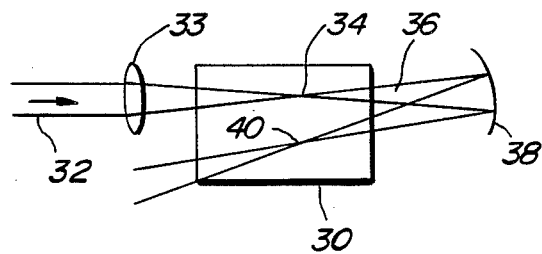
FIG. 2 is a schematic view of a one-cell implementation of the present invention.

FIG. 2 illustrates that an optically equivalent technique may be used, employing mirrors instead of lenses. In this case, a single SBS cell 30 is shown, with an incident beam 32 focused by a lens 32 at a first optical focus 34. The transmitted portion 36 of the incident beam is reflected by a curved mirror system 38, and refocused at a second optical focus 40 offset from the first focus. The effect is the same as in the FIG. 1 embodiment, and the SBS threshold is reduced by a factor of two. It is not necessary that the two foci 34, 40 overlap in the SBS cell 30, and it is believed to be desirable that the foci be spatially separated.

The technique described requires that the effective laser coherence length be commensurate with the total foci separation. It has been recognized that the coherence length, which is a measure of the temporal coherence of a laser beam, is an important factor in determining the effectiveness of the SBS process, and that there is no effective SBS process if the interaction length in which the process is to take place greatly exceeds the coherence length.

Laser sources oscillating in multiple longitudinal modes and having a greater oscillation bandwidth, i.e. multiple output frequencies, have a lesser degree of temporal coherence and a shorter coherence length. However, the technique of the invention may also be applied to such lasers. If the optical foci within the SBS medium are separated by a multiple of the laser resonator length, this will ensure that there is coherent addition at each focus and the device will still produce a desired reduction in the SBS threshold.

There are a number of advantages inherent in the provision of a lower SBS threshold. First, the technique of the invention permits SBS phase conjugation to be applied to higher average power situations. The laser sources can be of lower power and still operate the SBS cells at well above threshold. The lower threshold values also reduce problems due to competing processes, such as thermal blooming, and increase the overall system efficiency in systems employing the invention. Another advantage relates to the application of phase conjugation to compensate for beam aberrations. In some cases the deliberate insertion of an aberrating medium is used to improve conjugation fidelity. The arrangement of FIG. 1 allows the insertion of a suitable in-line aberrator between the first and second SBS cells, to improve conjugation fidelity.

It will be appreciated from the foregoing that the present invention represents a significant advance in the field of SBS phase conjugation. In particular, the invention provides a simple yet effective technique for reducing the threshold level at which the SBS process takes place. It will also be appreciated that, although two embodiments of the invention have been described in detail for purposes of illustration, various modifications may be made without departing from the spirit and scope of the invention. Accordingly, the invention is not to be limited except as by the appended claims.

We claim:

1. An optical phase conjugation device, comprising:
   at least one stimulated Brillouin scattering (SBS) cell containing an SBS medium;
   first focusing means, for focusing an incident light beam to a first focus in the SBS medium; and
   second focusing means, for focusing light transmitted through the first focus, to a second focus in the SBS medium, wherein a single incident beam to be phase conjugated is brought to successive multiple foci in the SBS medium, and whereby the effective SBS threshold level is inversely proportional, approximately, to the number of successive foci in the SBS medium.

2. An optical phase conjugation device as defined in claim 1, wherein:
   the first and second foci are located in separate first and second SBS cells;
   the first focusing means includes a lens disposed in the path of the incident beam; and
   the second focusing means includes a lens disposed between the first and second SBS cells.

3. An optical phase conjugation device as defined in claim 1, wherein:
   the first and second foci are located in a single SBS cell;
   the first focusing means includes a lens disposed in the path of the incident beam; and
   the second focusing means includes a curved mirror disposed in the path of the light transmitted through the first focus, to reflect and focus the light back into the SBS cell at the second focus, displaced laterally from the first.

4. An optical phase conjugation device as defined in claim 1, wherein:
the incident light beam is derived from a laser source having a resonant cavity of length L; and
the first and second foci are spaced apart by approximately nL, measured in the direction of light propagation between the foci, where n is a positive integer.

5. An optical phase conjugation device as defined in claim 2, wherein:
the incident light beam is derived from a laser source having a resonant cavity of length L; and
the first and second foci are spaced apart by approximately nL, measured in the direction of light propagation between the foci, where n is a positive integer.

6. An optical phase conjugation device as defined in claim 3, wherein:
the incident light beam is derived from a laser source having a resonant cavity of length L; and
the first and second foci are spaced apart by approximately nL, measured in the direction of light propagation between the foci, where n is a positive integer.

7. An optical phase conjugation device, comprising:
a plurality (N) of SBS cells, including a first, a second, an (N−1)th and Nth SBS cells; and
an equal plurality (N) of focusing means, including first, second and Nth focusing means;
wherein the first focusing means is disposed in the path of an incident light beam and focuses the beam to a first focus within the first SBS cell, the second focusing means is disposed sin the path of light transmitted through the first focus and out of the first SBS cell, and functions to focus this transmitted light to a second focus in the second SBS cell, and for any given value of K from K=3 to K=N, the Kth focusing means is disposed in the path of light transmitted through a (K−1)th focus and out of the (K−1)th SBS cell, and functions to focus this transmitted light to a Kth focus in the Kth SBS cell;
and whereby the effective SBS threshold level is inversely proportional, approximately, to the number N of foci in the SBS medium.

8. An optical phase conjugation device as defined in claim 7, wherein:
the incident light beam is derived from a laser source having a resonant cavity of length L; and
the first and second foci are spaced apart by approximately nL, measured in the direction of light propagation between the foci, where n is a positive integer.

9. A method for reducing the effective threshold of operation of a phase conjugation device using a stimulated Brillouin scattering (SBS) medium, the method comprising the steps of:
focusing an incident beam to a first focus within an SBS medium;
focusing light transmitted through the first focus, to a second focus within the SBS medium, wherein a single incident beam to be phase conjugated is brought to successive multiple foci in the SBS medium, and whereby the effective SBS threshold level is inversely proportional, approximately, to the number of successive foci in the SBS medium.

10. A method as defined in claim 9, wherein:
the first and second foci are located in separate first and second SBS cells;
the step of focusing the incident beam to a first focus is effected by means of at least one lens; and
the step of focusing to a second focus is effected by means of at least one lens disposed between the first and second SBS cells.

11. A method as defined in claim 9, wherein:
the first and second foci are located in a single SBS cell;
the step of focusing the incident beam to a first focus is effected by means of at least one lens; and
the step of focusing to a second focus is effected by means of at least one curved mirror disposed in the path of the light transmitted through the first focus, to reflect and focus the light back into the SBS cell at the second focus, which is displaced laterally from the first.

12. A method as defined in claim 9, wherein:
the incident light beam is derived from a laser source having resonant cavity of length L; and
the first and second foci are spaced apart by approximately nL, measured in the direction of light propagation between the foci, where n is a positive integer.

13. A method for reducing the effective threshold of operation of a phase conjugation device using a stimulated Brillouin scattering (SBS) medium, the method comprising the steps of:
focusing an incident light beam to a first focus located within an SBS medium;
focusing light transmitted through the first focus to a second focus located within the SBS medium but spatially separated from the first focus; and
focusing light transmitted through the first and second foci, to additional foci arranged in a serial relationship with the first and second foci, up to a total of N foci in all;
whereby the effective SBS threshold level is inversely proportional, approximately, to the number N of foci in the SBS medium.

14. A method as defined in claim 13, wherein:
the N foci are located in N separate SBS cells arranged serially; and
the focusing steps are performed by lenses disposed in the path of the incident light beam and between successive adjacent cells.

15. A method as defined in claim 13, wherein:
at least some of the N foci are spatially separated from each other but are located within a common SBS cell; and
the focusing steps are performed by lenses and focusing mirrors located outside the SBS cell, to produce multiple passes through the cell.

16. A method as defined in claim 13, wherein:
the incident light beam is derived from a laser source having resonant cavity of length L; and
the distance between first and second foci and between successive adjacent foci is approximately nL, measured in the direction of light propagation between the foci, where n is a positive integer.

* * * * *